Figure 1:
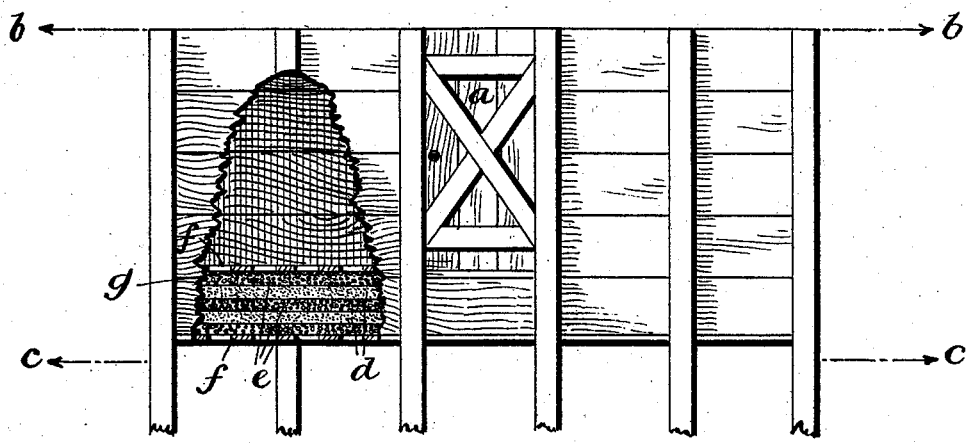
Figure 2:
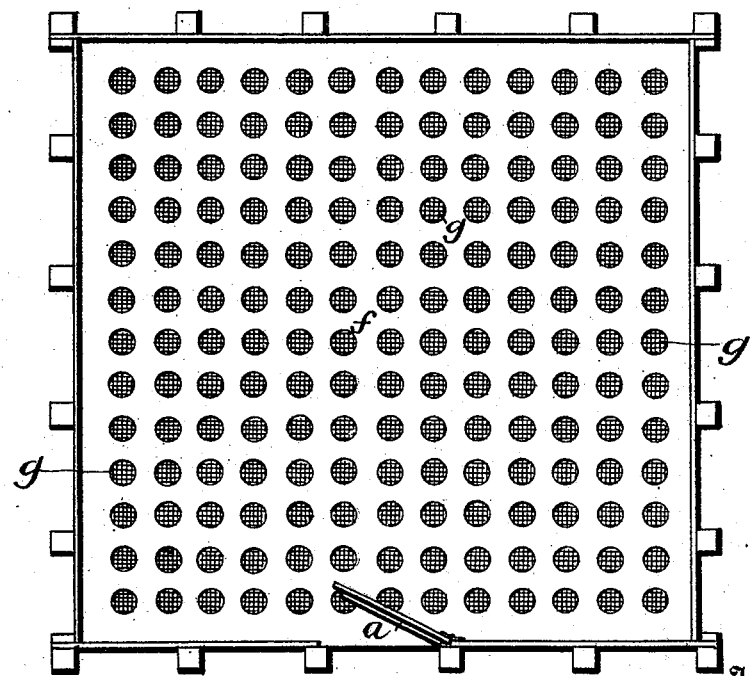

(No Model.)

W. F. HEATHMAN.
MEANS FOR EXTRACTING GOLD AND SILVER FROM SEA WATER.

No. 576,118. Patented Feb. 2, 1897.

Witnesses
J. G. Hinkel
[signature]

Inventor
Wm. Felix Heathman,
By [signature]
Attorneys

United States Patent Office.

WILLIAM F. HEATHMAN, OF SANTA ANA, CALIFORNIA, ASSIGNOR OF FORTY-NINE ONE-HUNDREDTHS TO ZEPHANIAH B. WEST, OF SAME PLACE.

MEANS FOR EXTRACTING GOLD AND SILVER FROM SEA-WATER.

SPECIFICATION forming part of Letters Patent No. 576,118, dated February 2, 1897.

Application filed April 1, 1895. Serial No. 544,121. (No model.)

*To all whom it may concern:*

Be it known that I, WILLIAM F. HEATHMAN, of the city of Santa Ana, county of Orange, State of California, have invented a new and useful Means for Extracting Gold and Silver from Sea-Water; and I do hereby declare that the following is a description of said art, process, or invention in such full, clear, and concise terms as to enable any person skilled in the art or science to which it is connected to compound, construct, make, and use the same.

In order to extract said metals, I pass the sea-water or salt-lake water through a filter made of carbon, and the gold and silver held in solution in the sea-water or salt-lake water are freed from the chemical combinations in which they occur in the water. The chlorids and bromids of gold and silver in solution when passing through the carbon filter are decomposed by the reducing power of the carbon, the liberation of chlorin, and the destruction of the bromin combination, with the result that metallic gold and silver are precipitated in the carbon filter and deposited in the pores and upon the surface of the carbon.

Before proceeding to a description of the carbon filter and the manner of handling the sea-water it will suffice to say that when the carbon filter has collected enough gold and silver to pay for extraction the carbon is removed from the filter and burned or lixiviated for the extraction of gold and silver according to the well-known chemical laws for the extraction of particular metals; but when the carbon is burned the ashes are collected and fused with borax and carbonate of soda for the extraction of gold and silver, and when the fused mass cools off the gold and silver bullion will be found at the lowest point of the melting-pot or crucible.

The carbon-filter is constructed as follows, reference being made to the drawing accompanying this application: Beginning with a wooden tank or vat of any size or height that may be required for large or small operations, the bottom of said tank $f$ is perforated with holes of an almost unlimited number, large enough to allow the water that filters to freely flow out. On the floor of the tank I lay a cloth $g$, either of wire or cotton. I next deposit upon the cloth thus laid a layer of carbon $e$, which shall be the coarser of the two kinds used, and upon which I place a layer of finely-broken carbon $d$, and thus alternate with coarse layers and fine layers of carbon until the filter is twelve inches, more or less, in thickness vertically. Over the carbon lay a wire-cloth $g$ to fit the size of the tank or any subdivision of the area of the tank, and upon the wire-cloth nail down and cover the whole filter with a top covering of planks $h$ or slats perforated with large holes for the free admission of the sea-water to the carbon filter.

In practice when the tank is filled with sea-water the sea-water enters the orifices in the top of the filter $h$, thus constructed and by gravity passes through the filter and through the cloth at the bottom of the filter and finds an outlet through the perforations in the bottom of the tank.

The wire-cloth and wooden top covering containing perforations for the admission of water may be dispensed with when coke is used as a filter, for the reason that the specific gravity of coke being greater than sea-water the coke remains stationary in the bottom of the filter; but it is necessary to use this wire-cloth and wooden covering of the filter when charcoal is used on account of its great buoyancy and liability to float away.

I have found that for the extraction of silver in this process it is not advisable to use a cotton cloth to be placed over the carbon. My reason for making this statement is that when I have used a cotton cloth on top of the carbon I have found no silver collected in the carbon, thus proving that the cotton cloth is an obstacle in the way of collecting silver in the filter, since some of the silver in the sea-water is not in solution, but consists of minute particles of silver chlorid held in suspension, which enter the filter and become entangled in the carbon but for the cloth. Hence I have advised the use of a wire-cloth or none at all when coke is used.

This tank and filter thus described I use on the land or on a structure built over the sea-water whenever power is used to pump the sea-water into the tank for filtration; but the most economical way I use this tank and filter in this process, and which entirely dispenses with the cost of power, is described as follows:

I construct a tank and filter thus described in the sea-water of some quiet bay which has the advantage of the rise and fall of the tides, so constructed that the wooden bottom of the filter $f$ will be above low-tide mark $c$ only a few inches, and when the tide rises the sea-water enters the tank by means of an automatic valve or gate $a$, which swings inward while the tides and sea-water are coming in; but after the sea-water has filled the tank at high tide $b$ the gate closes automatically when the tide begins to recede and flow out of the tank, thus leaving the tank full of water above the level of the sea, and the sea-water filters through the carbon filter in the bottom of the tank by gravity.

Now, having described my invention and discovery and shown the manner of using it, I particularly claim the following:

1. A tank arranged in position to be filled on the inflow of a tide and having an inwardly-opening valve or gate adapted to close on the reflux of the tide, said tank being provided at its bottom with openings and a carbonaceous filtering medium, substantially as described.

2. A tank mounted on suitable supports and provided in its side with an inwardly-opening valve or gate, said tank having a perforated bottom, and a filtering medium arranged on the bottom and comprising alternating layers of coarse and fine carbon, a layer of wire-cloth, and a perforated top covering, substantially as shown and for the purpose described.

WILLIAM F. HEATHMAN.

Witnesses:
A. J. WOOD,
R. A. BROWN.